US009274731B2

(12) United States Patent
Young (10) Patent No.: US 9,274,731 B2
(45) Date of Patent: Mar. 1, 2016

(54) SYSTEM AND METHOD FOR CONTROLLING A PRINT JOB (71) Applicant: CANON KABUSHIKI KAISHA, Tokyo (JP)

(72) Inventor: Chihsin Steven Young, Irvine, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/902,480

(22) Filed: May 24, 2013

(65) Prior Publication Data

US 2014/0347688 A1 Nov. 27, 2014

(51) Int. Cl.
*G06F 3/12* (2006.01)
*H04N 1/00* (2006.01)
*G06F 21/60* (2013.01)
*G06K 15/00* (2006.01)

(52) U.S. Cl.
CPC ............ *G06F 3/1259* (2013.01); *G06F 3/1219* (2013.01); *G06F 3/1229* (2013.01); *G06F 3/1273* (2013.01); *G06F 3/1285* (2013.01); *G06F 3/1296* (2013.01); *G06F 21/608* (2013.01); *G06K 15/00* (2013.01); *H04N 1/00204* (2013.01)

(58) Field of Classification Search
USPC ................ 358/1.13, 1.14, 1.15, 296
See application file for complete search history.

(56) References Cited

U.S. PATENT DOCUMENTS

| | | | |
|---|---|---|---|
| 6,353,484 B1 * | 3/2002 | Takashima | 358/1.15 |
| 6,654,137 B1 | 11/2003 | Yagita | |
| 7,701,603 B2 | 4/2010 | Nakayama | |
| 8,138,935 B2 | 3/2012 | Agata | |
| 2005/0254084 A1 | 11/2005 | Imoto | |
| 2006/0215208 A1 * | 9/2006 | Takayama | 358/1.14 |
| 2007/0019226 A1 * | 1/2007 | Matsuura et al. | 358/1.14 |
| 2009/0122341 A1 | 5/2009 | Natori | |
| 2010/0079300 A1 * | 4/2010 | Agata | 340/635 |
| 2012/0081746 A1 | 4/2012 | Yamaguchi | |
| 2012/0320412 A1 * | 12/2012 | Yoshimura et al. | 358/1.15 |

OTHER PUBLICATIONS

Kruszynski, Margin. "Notatki o WIndows 8 Consumer Preview—odc. 21." May 1, 2012. <http://marcinkruszynski.blogspot.com/2012/05/notatki-o-windows-8-consumer-preview.html>.
Seagull Scientific. "Status Monitor Overview." Oct. 10, 2011. <http://www.seagullscientific.com/ftp/whitepapers/WhitePaper_StatusMonitorOverview.pdf>.
"Custom Property for v4 Print Driver." Windows Metro Application Questions. Jun. 11, 2012. <http://answers.flyppdevportal.com/categories/metro/tailoringapps.aspx?ID=32832f37-a6e8-4218-bef5-6fb71256eaae>.

* cited by examiner

*Primary Examiner* — Vu B Hang
(74) *Attorney, Agent, or Firm* — Canon U.S.A., Inc., IP Division (57) ABSTRACT

A system and method for controlling a print job receive a request to print a print job; record, in the print job, a first time at which the request is received; obtain a second time at which the print job is sent to a printing device; calculate an elapsed time between the first time recorded in the print job and the second time obtained; determine whether the elapsed time is larger than a predetermined time period, and generate a notification based on the determination.

20 Claims, 10 Drawing Sheets

SYSTEM AND METHOD FOR CONTROLLING A PRINT JOB

BACKGROUND

1. Field of the Disclosure

The present disclosure generally relates to a system and method for controlling a print job.

2. Description of the Related Art

As environmental concerns to conserve natural resources have increased worldwide in recent years, paperless offices are being promoted to reduce consumption of paper and other printing resources. Thus, more documents are read and stored electronically, resulting in larger documents. Yet, situations still exist where paper copies of documents are desired. In such cases, print settings, such as duplex printing and N-up printing, are utilized to reduce resource consumption when printing. Additionally, printing duplicate copies of documents is carefully performed to avoid printing any unnecessary copies. However, when documents are not printed promptly, a duplicate copy of the document tends to be printed. For example, a user sends a print job to a printer. However, the printer is not able to process the print job, because the printer is out of toner. Instead of replacing the toner of the printer, the user resends the print job to another printer that is able to process the print job. After a while, when the user replaces the toner of the first printer, the first printer starts processing the print job that has already been processed by the other printer. At this time, an unnecessary copy of the print job is printed, and printing resources are wasted.

A print job is left in a print queue of a printer until the print job is processed or cancelled. Thus, in order to avoid wasting resources, the user is required to open the print queue of the first printer and cancel the print job when the user resends the print job to another printer. However, the user may not know how to access the print queue or the process may be cumbersome for the user. Additionally, the user may not remember to cancel the print job. In such cases, it is difficult to avoid printing unnecessary copies of documents. Furthermore, since the size of documents is increasing nowadays, when unnecessary copies are printed a large amount of paper and other associated resources are wasted.

SUMMARY

In one embodiment, a method for controlling a print job comprises receiving a request to print a print job, recording, in a print ticket of the print job, a first time at which the request is received, retrieving a second time at which a printing device becomes online, wherein the printing device is the print device to which the print job is sent, calculating an elapsed time between the first time recorded in the print ticket and the second time retrieved when the printing device became online, determining whether the elapsed time is larger than a predetermined time period, and displaying a notification based on the determination.

DETAILED DESCRIPTION OF CERTAIN EMBODIMENTS

The following description is of certain illustrative embodiments, although other embodiments may include alternatives, equivalents, and modifications. Additionally, the illustrative embodiments may include several novel features, and a particular feature may not be essential to practice the systems and methods described herein.

Figure 1:
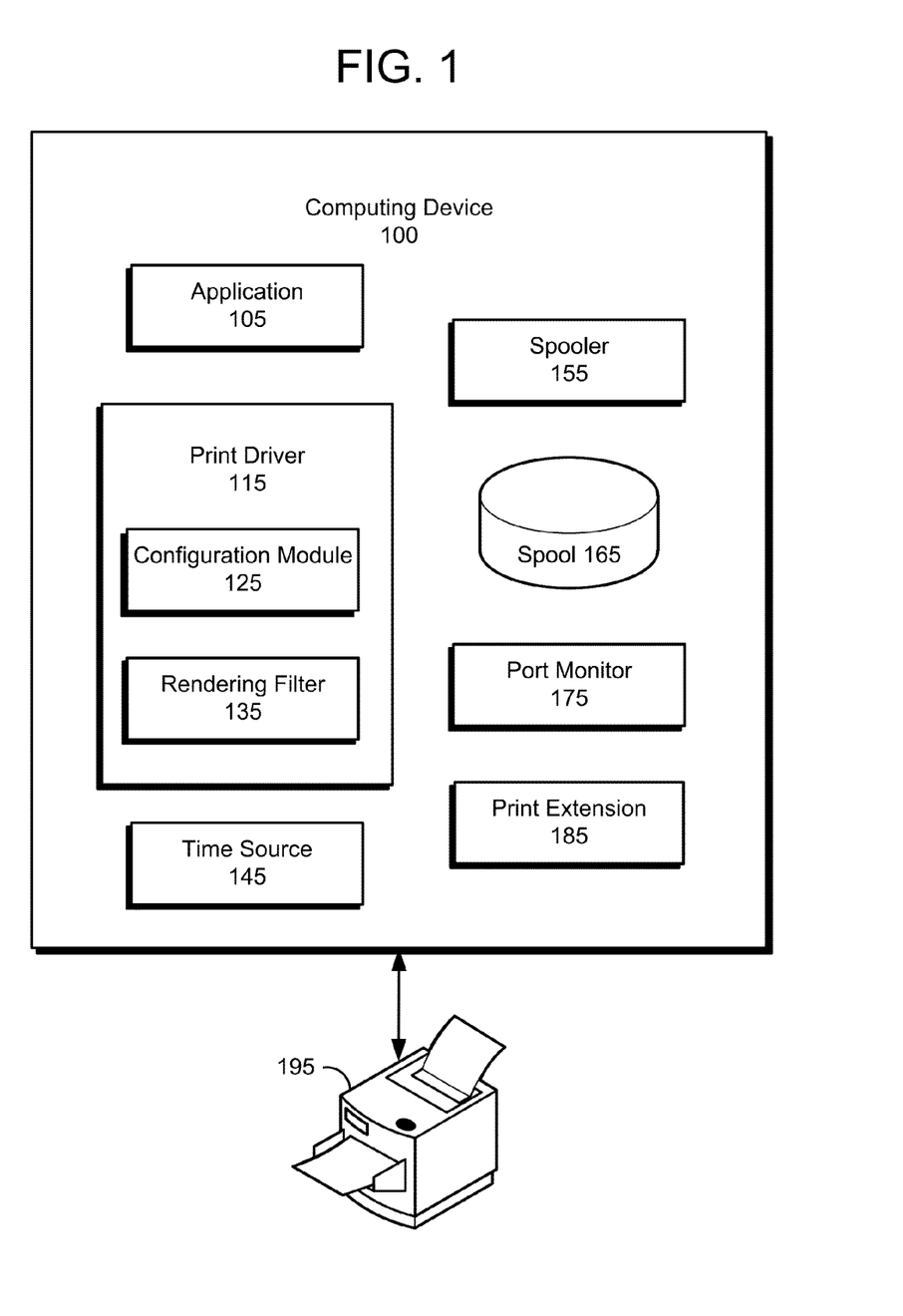
FIG. 1 is a block diagram illustrating an embodiment of a printing system.

FIG. 1 is a block diagram illustrating an embodiment of a printing system. The printing system includes a computing device 100 and a printing device 195. The entities in the printing system may communicate via wired or wireless channels that allow the exchange of data between the entities.

The computing device 100 may be any computing device, such as a desktop, laptop computer, and server. In some embodiments, the computing device 100 is a mobile phone, a personal digital assistant (PDA), or a tablet that is capable of communicating via a network and/or may include at least one display that is capable of rendering images. The computing device 100 includes one or more processors (also referred to herein as "CPUs"), which may be conventional or customized microprocessor(s). The CPUs are configured to read and execute computer-readable instructions, and the CPUs may command or control other components of the computing device 100.

The computing device 100 also includes I/O interfaces or I/O devices. The I/O interfaces provide communication interfaces to I/O devices, and the I/O devices may include a keyboard, a display device, a mouse, a printing device, a touch screen, a light pen, an optical storage device, a scanner, a microphone, a camera, etc. The computing device 100 also includes memory, which may be volatile or non-volatile, such as ROM, RAM, and flash memory. The computing device 100 further includes a network interface that allows the computing device 100 to communicate with the other devices. The computing device 100 also includes a storage device that is configured to store data or modules and may include, for example, a hard drive, an optical storage device, a diskette, or a solid state drive. The computing device 100 includes an operating system, which manages the hardware, the processes, the interrupts, the memory, or the file system of the computing device 100. The computing device 100 also incorporates bidirectional (bidi) extension techniques to bidirectionally communicate with a connected device (e.g., the printing device 195). The computing device 100 further includes an application 105, a print driver 115, which includes a configuration module 125 and a rendering filter 135, a time source 145, a spooler 155, a spool 165, a port monitor 175, and a print extension 185.

The application 105 may be any application that prints data, such as a document processing application or a web browser. The application 105 is configured to generate a user interface that presents information to a user or receives information from the user via the computing device 100 (e.g., via the I/O interfaces of the computing device 100). The user interface may present information in the form of a graphical interface that shows settings and capabilities of a printing device (e.g., the printing device 195) and that receives user selections, such as selections of one or more options for a respective setting. The information may also be presented in any other manner that allows the user to view the information or select one or more options. The application 105 is further configured to create application data based on the selected options for respective settings of the printing device. In some embodiments, a part of the application data may be organized in the form of markup language data, for example a Print-Ticket document. The PrintTicket document may be a document defined by the Print Schema of Microsoft.

The print driver 115 is configured to communicate with the application 105 to generate print data, which is to be processed by the printing device (e.g., printing device 195), based on the application data. The print driver 115 is further configured to communicate with a time source 145 to obtain time information. The print driver 115 may be, but is not limited to, a Windows v4 Print Driver. The print driver 115 also includes the configuration module 125 and the rendering filter 135.

The configuration module 125 validates and processes the application data generated by the application 105. If the application data is validated, the configuration module 125 generates a print job based on the validated application data. The generated print job may also include a PrintTicket document, which is XML data describing the selected print options. For the purpose of description, the configuration module 125 is described as performing the operations. However, a computing device implements the operations of the configuration module 125. The rendering filter 135 reconfigures the print job and generates print data in a format, such a page description language (PDL), supported by the printing device 195. The rendering filter 135 is also configured to provide a request for handling events to the port monitor 175 and the print extension 185 via the print driver 115. The functions performed by the print driver 115 with the configuration module 125 and the rendering filter 135 will be described in additional detail hereinafter.

The time source 145 is an internal system clock of the computing device 100. However, in some embodiments, the time source 145 may be an external clock that is independent of the computing device 100. The time source 145 is configured to provide time information.

The spooler 155 is configured to communicate with the print driver 115 to transfer the print job generated by the configuration module 125 to and from a repository (e.g., the spool 165) and is also configured to communicate with the port monitor 175 to retrieve the status of the printing device 195. The spool 165 is configured to temporarily store the print job transferred from the spooler 155.

The port monitor 175 allows communications between the print driver 115 and the printing device 195. The port monitor 175 may include a bidi extension (not illustrated) to support the bidirectional communication. Further, the port monitor 175 is capable of receiving requests, such as Bidi function calls, and generating corresponding Bidi function-call responses.

The print extension 185 is configured to communicate with the port monitor 175 to generate a user interface that presents information to a user or that receives information from the user via the computing device 100. The user interface may present information in the form of a graphical interface that shows a reminder to inform the user of a potential printing of an already-processed print job or an option to cancel the print job and that receives user selections, such as a cancellation of the print job. The information may also be presented in any other computer-implemented manner that allows the user to view the information or select options.

The printing device 195 is configured to communicate with the port monitor 175 to process the print data and generate images on one or more print media according to the print data.

Figure 2:
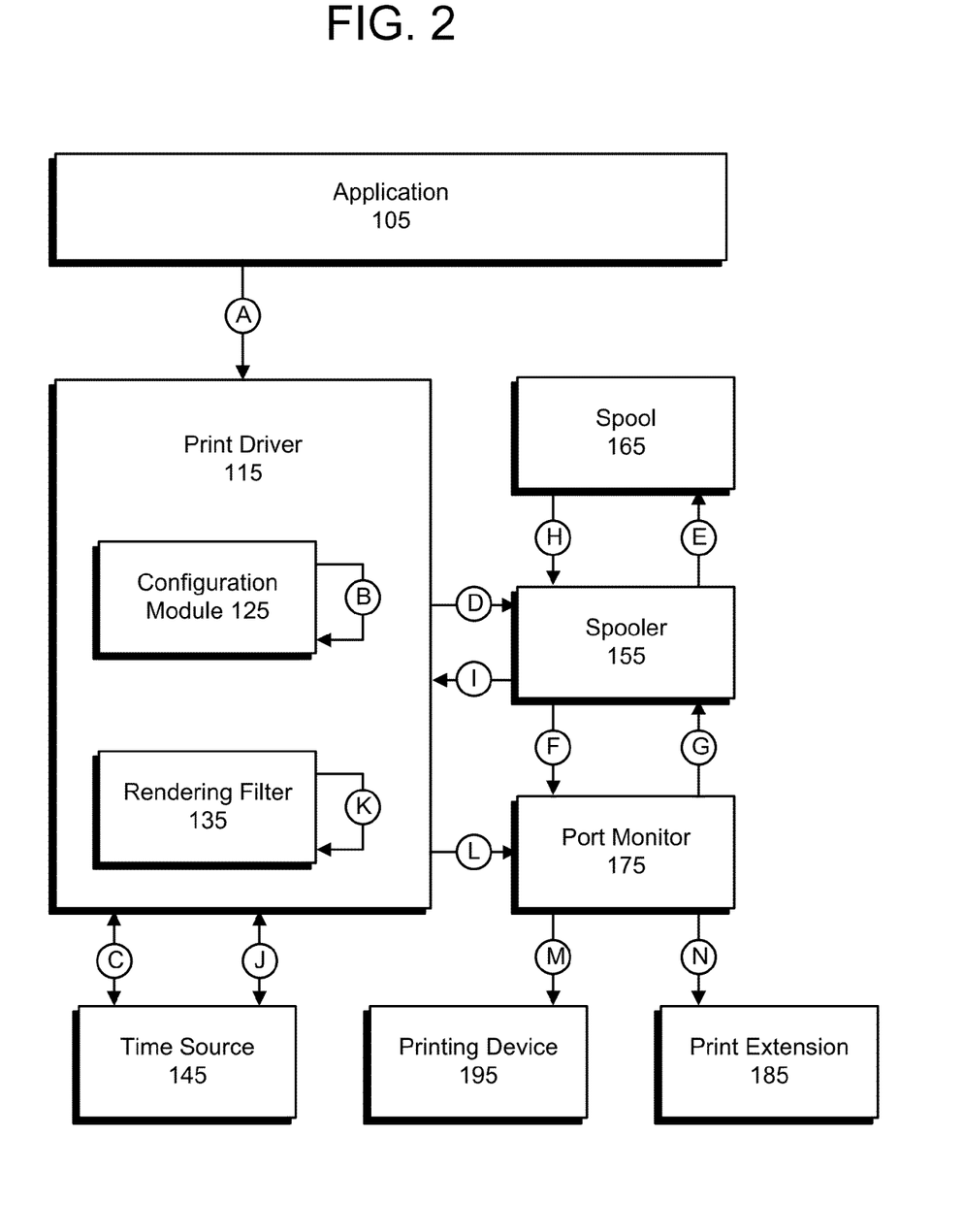
FIG. 2 is a block diagram illustrating an embodiment of a method for managing a print job.

FIG. 2 is a block diagram illustrating an overview of an embodiment of a method for managing a print job. Beginning in stage A, an application 105 receives a print request from a user and sends application data to a print driver 115. In stage B, after the print driver 115 receives the application data, a configuration module 125 of the print driver 115 generates a print job based on the application data. In stage C, the configuration module 125 obtains first time information from a time source 145 via the print driver 115 and records the first time information in the print job.

In stage D, the print driver 115 sends the generated print job, including the first time information, to a spooler 155. In stage E, the spooler 155 transfers the print job to a spool 165 to temporarily store the print job. In stage F, the spooler 155 sends an inquiry to the port monitor 175 regarding the status of the printing device 195. In stage G, the port monitor 175 returns the status of the printing device 195 to the spooler 155. In stage H, when the returned status of the printing device 195 indicates that the printing device 195 is ready to process a print job, the spooler 155 fetches the temporarily stored print job from the spool 165. In stage I, the spooler 155 returns the fetched print job to the print driver 115.

In stage J, when the rendering filter 135 receives the print job via the print driver 115, the rendering filter 135 obtains second time information from the time source 145. In stage K, the rendering filter 135 renders the print job and generates print data in the format supported by the printing device 195. Further, the rendering filter 135 extracts the recorded first time information from the print job and calculates the elapsed time between the first time information and the second time information. If the elapsed time is greater than a predetermined period of time, the rendering filter 135 creates a request for setting an event handling function. However, if the elapsed time is not greater than the predetermined period of time, the rendering filter 135 does not create a request for setting an event handling function.

In stage L, if the elapsed time is determined to be greater than the predetermined period of time and the rendering filter 135 created a request, the print driver 115 sends the print data and the request to the port monitor 175. However, if the elapsed time is determined to be less than the predetermined period of time, the request is not created. Thus, the print driver 115 sends the print data to the port monitor 175 but does not send a request. In stage M, if the port monitor 175 did not receive the request in stage L, the port monitor 175 sends the print data to the printing device 195, which processes the print data and produces a printed version of the print data. In stage N, if the port monitor 175 receives the request in stage L, the port monitor 175 provides an instruction to display a system notification via the computing device 100. Further, the port monitor 175 provides instructions to the print extension 185 to generate a user interface when the user responds to the system notification, which presents an alert or an option to cancel the print job. The user interface generated by the print extension 185 is also displayed via the computing device 100.

Figure 3:
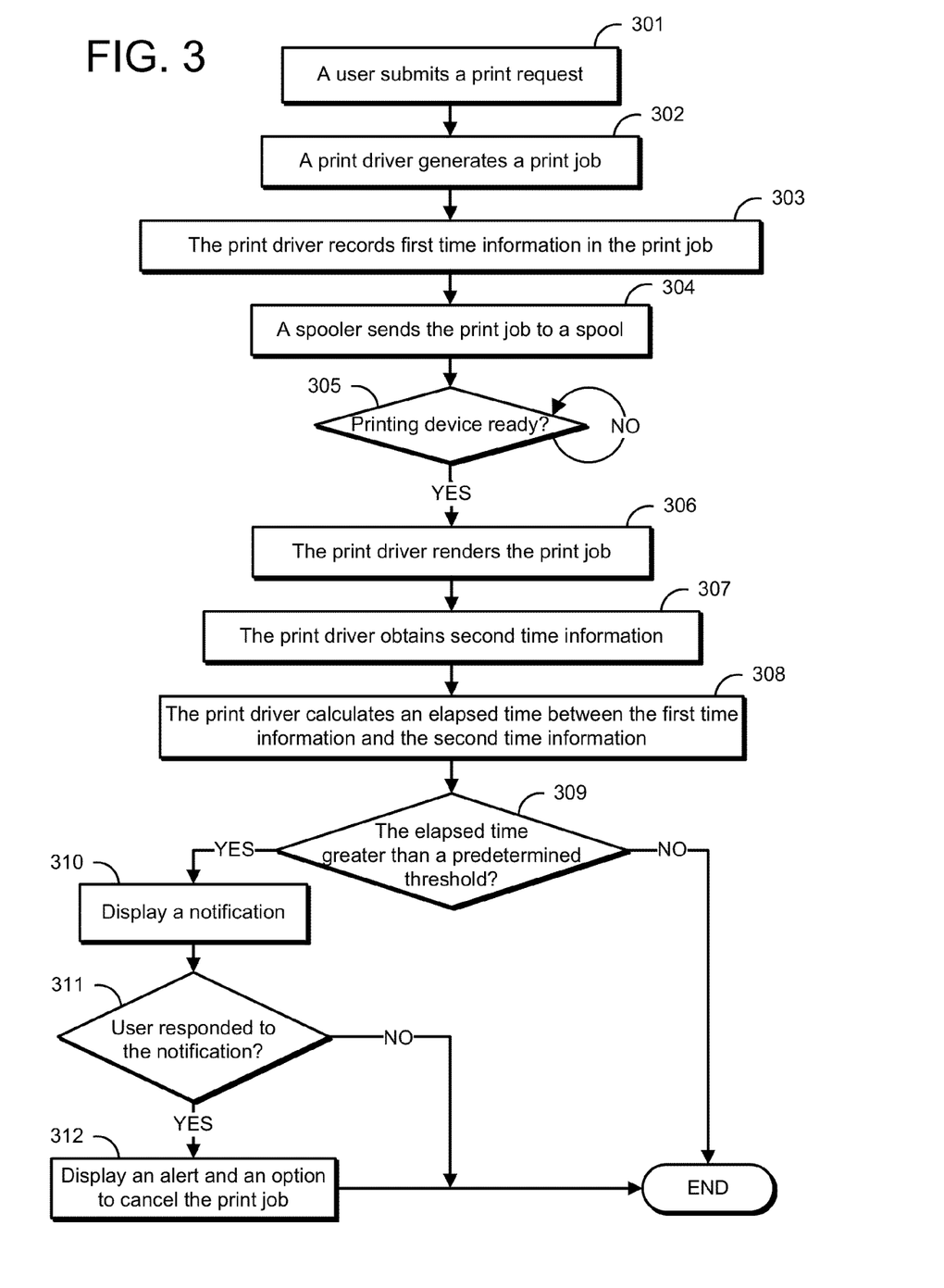
FIG. 3 is a flowchart illustrating an overview of an embodiment of a method for managing a print job.

FIG. 3 is a flowchart illustrating an overview of an embodiment of a method for managing a print job. The blocks of this method and the other methods described herein may be performed by one or more computing devices, for example the systems and devices described herein. Also, other embodiments of this method and the other methods described herein may omit blocks, add blocks, change the order of the blocks, combine blocks, or divide blocks into more blocks. Beginning in block 301, after a user selects necessary print settings to fulfill the user's printing intent, the user submits a print request to a target printing device (e.g., the printing device 195) via a user interface or an application (e.g., the application 105 shown in FIG. 1). In block 302, when the print driver (e.g., print driver 115) of the target printing device receives the print request, the print driver generates a print job according to the print request. In block 303, the print driver obtains first time information (e.g., a first reception time) from a time source (e.g., the time source 145) and records the first time information in the print job. In block 304, a spooler (e.g., the spooler 155) sends the print job to a spool (e.g., the spool 165) to store the print job until the printing device is ready to process the print job. In block 305, whether a printing device (e.g., the printing device 195) is ready to process the print job is determined. If the printing device is ready to process (block 305=YES), the flow proceeds to block 306. Otherwise, if the print device is not ready to process the print job (block 305=NO), the flow repeats block 305 until the printing device is ready to process the print job. In block 306, the print driver renders the print job when the printing device is available to process the print job. In block 307, when the print driver renders the print job, the print driver obtains second time information (e.g., a second reception time) from the time source. However, as mentioned above, in some embodiments, the print driver obtains the second time information when the print driver receives a signal to render the print job instead of actually rendering the print job. Further, the time source from which the print driver obtains the second time information may be different from the time source from which the print driver obtains the first time information.

In block 308, the print driver calculates an elapsed time between the first time information and the second time information. In block 309, the print driver determines whether the elapsed time is greater than a predetermined threshold. If in block 309 the print driver determines that the elapsed time is greater than the predetermined threshold (block 309=YES), then the flow proceeds to block 310, otherwise (block 309=NO) the flow ends. In block 3010, a first notification is displayed. The first notification may be delivered by a native notification system, such as a toast notification system in Windows. In block 311, it is determined whether a user has responded to the displayed first notification. If a user is determined to have responded (block 311=YES), then the flow proceeds to block 312, otherwise (block 311=NO) the flow ends. In block 312, a second notification to allow the user to cancel the print job is displayed. The first or second notification may include an alert to warn the user that the print job may already have been printed.

Figure 4:
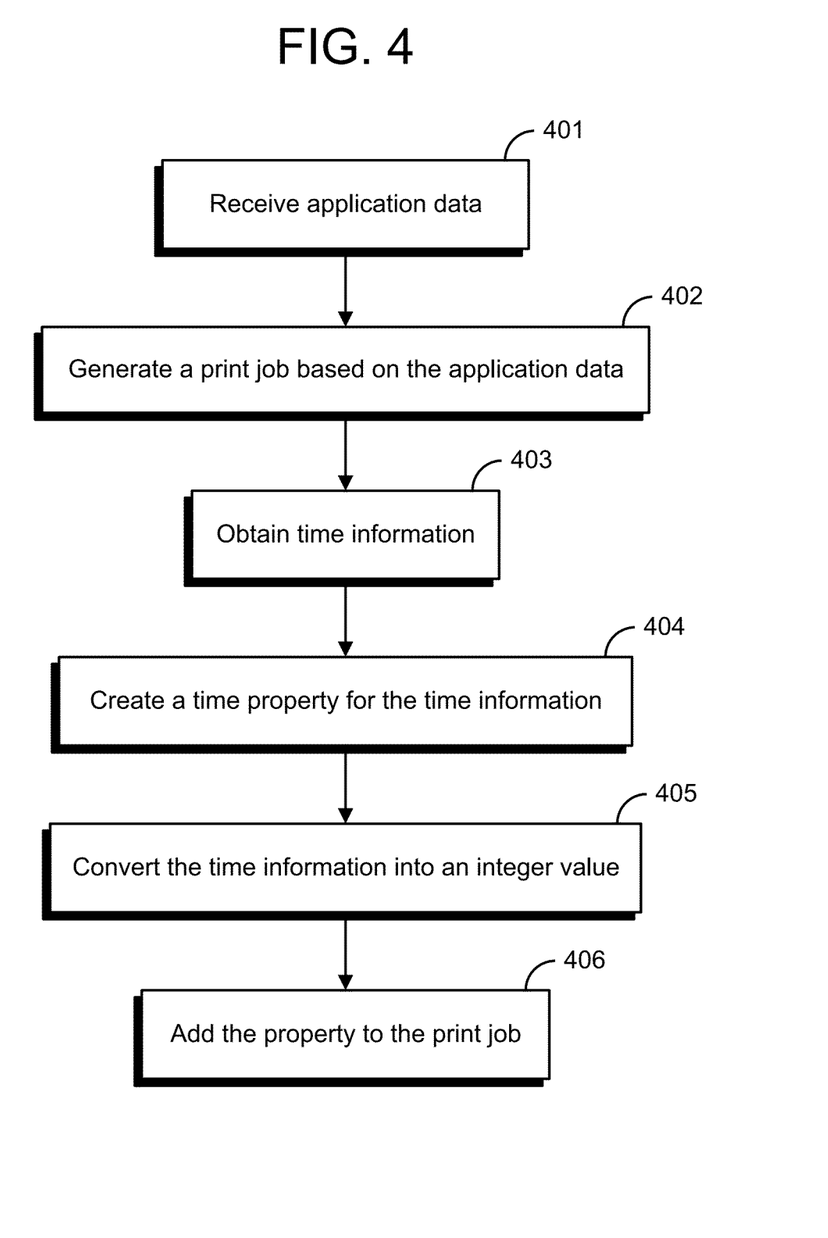
FIG. 4 is a flowchart illustrating an embodiment of a method for recording time in a print job.

FIG. 4 is a flowchart illustrating an embodiment of a method for recording time in a print job. In the illustrated embodiment, when a configuration module (e.g., the configuration module 125) receives application data from an application (e.g., the application 105) via a print driver (e.g., the print driver 115), the configuration module obtains and records time information in a print job while generating the print job based on the received application data. Additional details of the method will be described hereinafter.

Beginning in block 401, a configuration module receives application data from an application. For example, when a user submits a print request with desired print settings, an application creates application data according to the print request and sends the application data to a configuration module in a print driver. The application data, including the user preferred print settings information, is organized in the form of markup language data, such a PrintTicket document. In block 402, the configuration module validates the selected print settings of the application data and generates a print job based on the validated application data. The print job is also organized in a PrintTicket document format. In block 403, the configuration module obtains first time information (e.g., first reception time) from a time source. The time information obtained from the time source (e.g., the time source 145) may be the current time of the time source. In some embodiments, the time information obtained from the time source may be some other time indicated by the time source, for example, starting from zero (00:00). Additionally, the time information obtained from the time source may be indicated in a standard format, such as hours followed by minutes (hh:mm). In some embodiments, the time information may include additional information, such as year and date (yyyy/mm/dd).

In block 404, the configuration module creates a time property for the first reception time. The time property may be an XML schema definition (XSD) based property. Further, the time property is an integer-type property that is configured to take an integer as its value. However, the time property is not limited to an integer-type property in all embodiments and may be any other applicable property type, such as string, duration, time, or dateTime, in other embodiments. In block 405, the configuration module converts the first reception time into an integer and assigns the integer as the value of the time property. However, if the time property type differs from the integer-type property, the configuration module converts the time information obtained from the time source into the format suitable to the value of the different type of time property. In block 406, the configuration module adds the time property, including the assigned value, to the PrintTicket of the print job. The following is an example of the integer-type time property added to the PrintTicket of the print job:

```
<psf:Property name="ns0000:PrintJobTime">
    <psf:Property name="ns0000:LowPart">
        <psf:Value xsi:type="xsd:integer">49038923</psf:Value>
    </psf:Property>
    <psf:Property name="ns0000:HighPart">
        <psf:Value xsi:type="xsd:integer">61385939</psf:Value>
    </psf:Property>
</psf:Property>
```

Further, in some embodiments, the time information obtained from the time source is added to the print job in the format indicated by the time source. In such a case, the configuration module is not required to convert the time information to a value suitable for the time property type.

Figure 5:
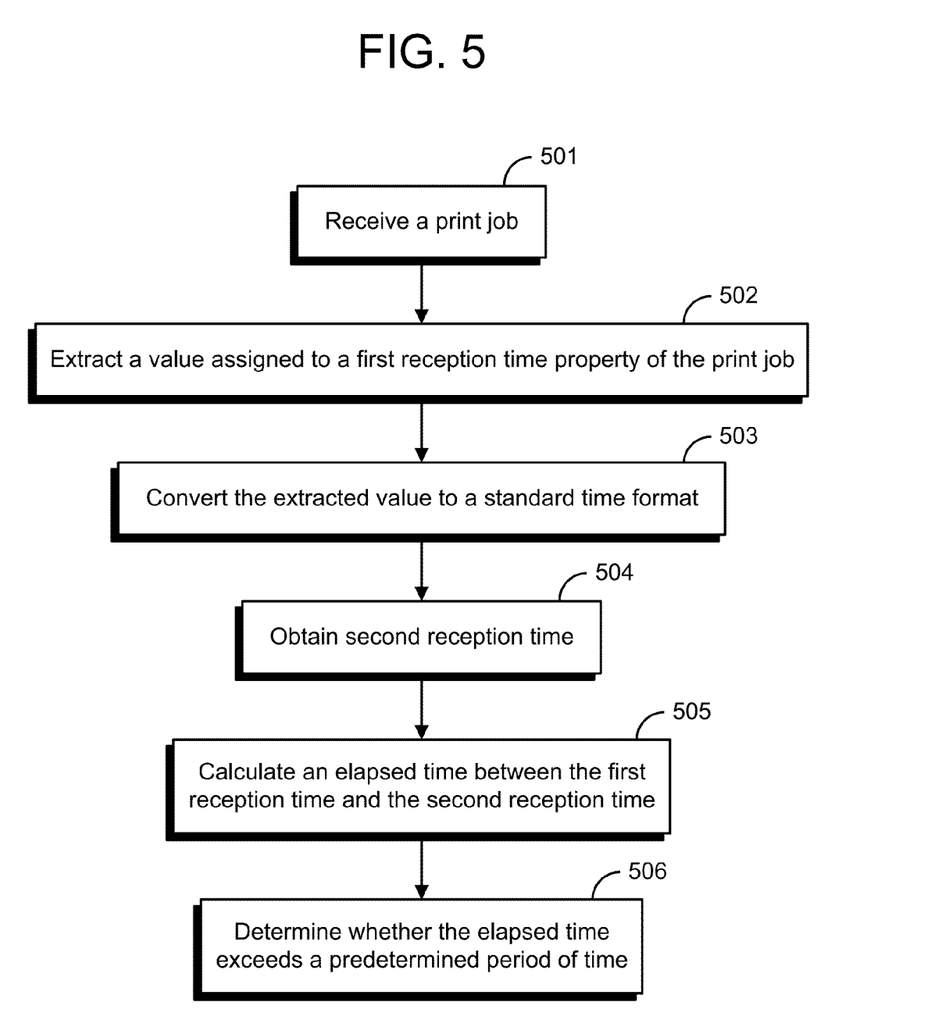
FIG. 5 is a flowchart illustrating an embodiment of a method for determining an elapsed time between a first reception time and a second reception time.

FIG. 5 is a flowchart illustrating an embodiment of a method for determining an elapsed time between a first reception time and a second reception time. In block 501, when a spooler (e.g., the spooler 155) retrieves the print job from a spool (e.g., the spool 165), the print job is sent to, and received by, a rendering filter (e.g., the rendering filter 135) in a print driver (e.g., the print driver 115). In block 502, the rendering filter extracts the value (e.g., the integer value) assigned to the added time property of the print job. In block 503, the rendering filter converts the extracted value to a standard time format, such as hours followed by minutes and seconds (hh:mm:ss). However, in some embodiments, the value assigned to the property does not require converting. That is, the first reception time is added to the print job without converting the first reception time into a different format. In such embodiments, block 503 may be omitted.

In block 504, the rendering filter obtains second time information (e.g., a second reception time) from a time source (e.g., time source 145). The second time source may differ from the first time source from which the first reception time was obtained. In block 505, the rendering filter calculates an elapsed time between the first reception time and the second reception time. In some embodiments, the second reception time is converted into a format that conforms with the format of the value that the first reception time was converted to. In such embodiments, the rendering filter may calculate an elapsed time using the values that the first reception time and the second reception time were converted to, instead of converting the values back to a standard time format. Additionally, in some embodiments, the first reception time is converted into a new type of format in block 503 instead of converted back into a format indicated by the time source. In such a case, the second reception time may be converted into a new type of format that conforms with the new type of format of the first reception time. In block 506, the rendering filter determines whether the elapsed time is greater than a predetermined period of time, for example five minutes, ten minutes, or fifteen minutes.

Figure 6:
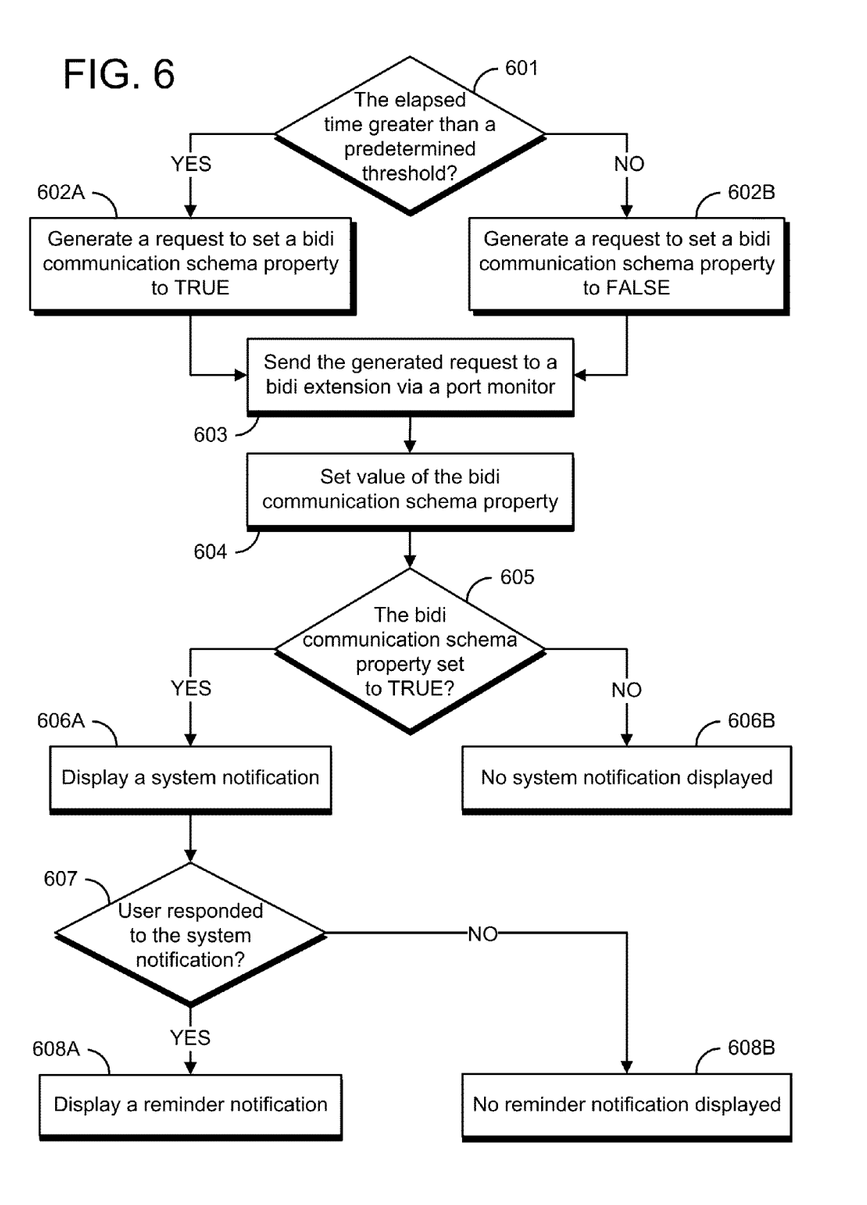
FIG. 6 is a flowchart illustrating an embodiment of a method for displaying a reminder notification.

FIG. 6 is a flowchart illustrating an embodiment of a method for displaying a reminder notification. In the illustrated embodiment, when the elapsed time is determined to be greater than the predetermined period of time, a system notification is displayed to a user. When the user responds to the system notification, a reminder notification, which notifies the user that the print job that is about to be printed may already been printed, is displayed. Additionally, the reminder notification may include an option for the user to cancel the print job.

Beginning in block 601, a rendering filter (e.g., the rendering filter 135) determines whether the elapsed time is greater than a predetermined threshold. For example, the rendering filter compares an elapsed time, which is between a first reception time and a second reception time, to a predetermined period of time, such as five minutes. If the elapsed time is greater than the predetermined threshold (block 601=YES), then the flow proceeds to block 602A. If the elapsed time is not greater than the predetermined threshold (block 601=NO), then the flow proceeds to block 602B. In block 602A, when the elapsed time is determined to be greater than the predetermined threshold (block 601=YES), the rendering filter generates a request to set a bidi-communication-schema property to TRUE. For example, the rendering filter may generate a bidi request, such as a "BIDI_ACTION_SET" bidi request, to help a bidi extension included in a port monitor (e.g., the port monitor 175) to set the value of a bidi-communication-schema property to TRUE. Otherwise, in block 602B, when the elapsed time is determined not to be greater than the predetermined threshold (block 601=NO), the rendering filter generates a request to set a bidi-communication-schema property to FALSE.

In block 603, the rendering filter sends the generated request to a bidi extension via the port monitor. The bidi extension may be a universal serial bus (USB) Bidi JavaScript for USB printers or may be printer firmware that is configured to handle bidi schema for web services on devices (WSD) or transmission control for protocol/internet protocol (TCP/IP) printers. In block 604, the bidi extension sets the value of the bidi-communication-schema property based on the request from the rendering filter. If the bidi extension receives a request to set the bidi-communication-schema property to FALSE, the bidi extension sets the Bidi-communication-schema property to FALSE. Otherwise, if the bidi extension receives a request to set the bidi-communication-schema property to TRUE, the bidi extension sets the bidi-communicaiton-schema property to TRUE. When the bidi-communication-schema property is set to TRUE, the bidi extension creates a Bidi file to add the bidi communication schema property to the print schema. The Bidi file may be BidiWSDFile, BidiUSBFile, BidiSPMFile (Standard Port Monitor), or BidiUSBJVFile (USBJavaScript). Further, a driver event file is created to add a trigger event for the Bidi-communication-schema property in the print schema. For example, when the user responds to the system notification, a function of a print extension is triggered to generate and display a reminder notification. Furthermore, a notification handler for the trigger event is added to the print extension.

In block 605, whether the Bidi-communication-schema property is set to TRUE is determined. If the bidi communication schema property is set to TRUE (block 605=YES), then the flow proceeds to block 606A, and if not (block 605=NO), then the flow proceeds to block 606B. In block 606A, a system notification is displayed to the user. In block 606B, a system notification is not displayed to the user.

If the flow proceeded to block 606A, after block 606A the flow proceeds to block 607. In block 607, whether the user responded to the system notification is determined. The system notification is presented to a user, and the user may respond to the system notification by activating, clicking, touching, pressing, or tapping on the system notification using an input device (e.g., a mouse, a touchscreen, a keyboard). If the user has responded to the system notification (block 607=YES), then the flow proceeds to block 608A, otherwise (block 607=NO) the flow proceeds to block 608B. In block 608A, if the user responded to the system notification, a reminder notification is generated and displayed to the user. For example, if the user responded to the system notification, a function of the print extension to generate and display the reminder notification is invoked. The reminder notification is a user interface that warns the user of a possible unnecessary print job, and the user interface may allow the user to cancel the print job or proceed with the printing of the print job. However, if the user did not respond to the system notification in block 607 (block 607=NO), the reminder notification is not displayed and the flow ends.

Figure 7:
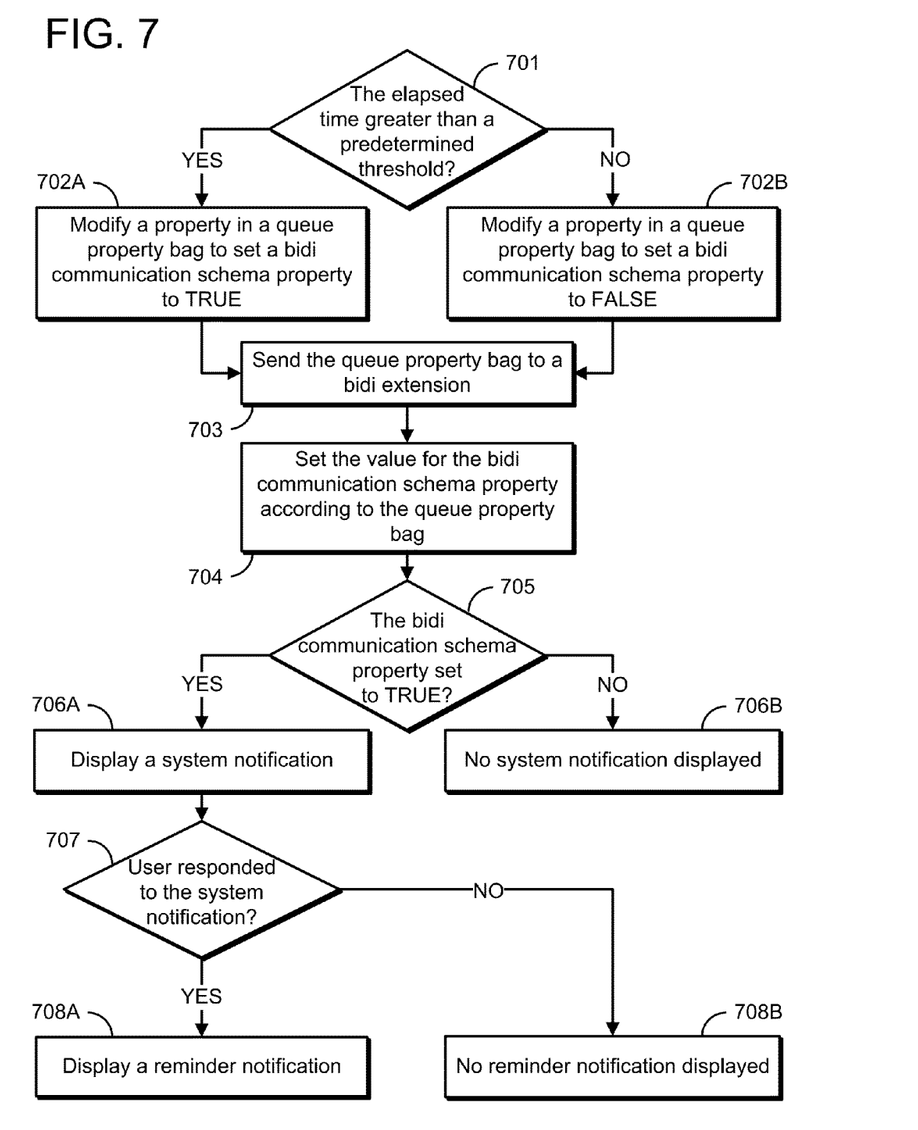
FIG. 7 is a flowchart illustrating an embodiment of a method for displaying a reminder notification.

FIG. 7 is a flowchart illustrating an embodiment of a method for displaying a reminder notification. Beginning in block 701, a rendering filter (e.g., the rendering filter 135) determines whether the elapsed time is greater than a predetermined threshold. For example, the rendering filter 135 compares the time that elapsed between the first reception time and the second reception time to a predetermined period of time, such as eight minutes. If the elapsed time is greater than the predetermined threshold (block 701=YES), then the flow proceeds to block 702A. If the elapsed time is not greater than the predetermined threshold (block 701=NO), then the flow proceeds to block 702B. In block 702A, the rendering filter modifies a property in a queue property bag to set a bidi communication schema property to TRUE. The queue property bag is configured to store configurations for queue properties in a print schema. The queue property bag is also configured to be transferred from the rendering filter to a port monitor (e.g., the port monitor 175). Further, the rendering filter modifies the property in the queue property bag, to facilitate a bidi extension included in the port monitor, to set the value of a bidi communication schema property to TRUE. When the modified property of the queue property bag indicates that the bidi communication schema property is set to TRUE, the bidi extension creates a bidi file to add the bidi communication schema property to the print schema. The bidi file may be BidiWSDFile, BidiUSBFile, BidiSPMFile (Standard Port Monitor), or BidiUSBJVFile (USBJavaScript). Further, a driver event file is created to add a trigger event for the bidi communication schema property in the print schema. For example, in one embodiment, when the user responds to the system notification, a function of a print extension is triggered to generate and display a reminder notification. Furthermore, a notification handler for the trigger event is added to the print extension. On the other hand, in block 702B, if the elapsed time is determined to be not greater than the predetermined threshold, the rendering filter modifies a property in the queue property bag to set a bidi communication schema property to FALSE.

In block 703, the rendering filter sends the queue property bag to a bidi extension via the port monitor. In block 704, the bidi extension verifies the queue property bag and sets the value for the bidi communication schema property according to the modified property of the queue property bag. As mentioned above, the bidi extension may be a universal serial bus (USB) Bidi JavaScript for USB printers, or the bidi extension may be printer firmware that is configured to handle bidi schemas for web services on devices (WSD) or transmission control protocol/internet protocol (TCP/IP) printers.

In block 705, whether the bidi communication schema property is set to TRUE is determined. If the bidi communication schema property is set to TRUE (block 705=YES), then the flow proceeds to block 706A. If the bidi communication schema property is set to FALSE (block 705=NO), then the flow proceeds to block 706B. In block 706A, a system notification is displayed to the user. In block 706B, the system notification is not displayed to the user and then the flow ends after block 706B.

From block 706A, the flow moves to block 707. In block 707, it is determined if the user responded to the system notification. For example, a user may respond to the system notification by clicking, touching, pressing, or tapping on a system notification presented on a graphical user interface. If in block 707 it is determined that the user responded to the system notification (block 707=YES), then the flow moves to block 708A. If in block 707 it is determined that the user did not respond to the system notification (block 707=NO), then the flow moves to block 708B. In block 708A, if the user responded to the system notification (block 707=YES), a reminder notification is generated and displayed for the user. For example, when the user responds to the system notification, a function of the print extension that generates and displays the reminder notification is invoked. The reminder notification is a user interface that warns the user of possible unnecessary print job or that allows the user to cancel the print job or proceed with the printing of the print job. In block 708B, if the user did not respond to the system notification (block 707=NO), the reminder notification is not displayed.

Figure 8:
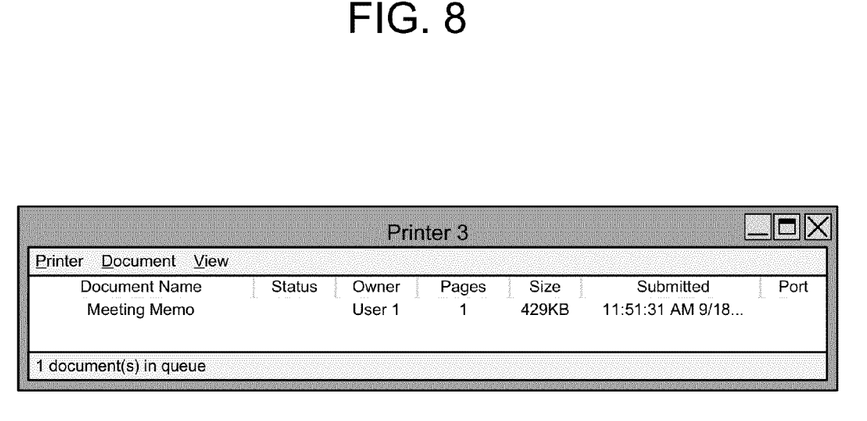
FIG. 8 illustrates an example embodiment of a print queue.

FIG. 8 illustrates an example embodiment of a print queue. The print queue is configured to visually represent the spool content (e.g., print jobs) via a computing device (e.g., via the I/O interfaces of the computing device 100). The user may utilize the print queue to verify the content of the spool. The content of a spool (e.g., the spool 165) includes a print job generated by a configuration module (e.g., the configuration module 125). The spool usually stores the print job until a rendering filter (e.g., the rendering filter 135) renders the print job and a printing device (e.g., the printing device 195) processes the rendered print job. In some embodiments, the spool stores the print job until the print job is cancelled.

Figure 9:
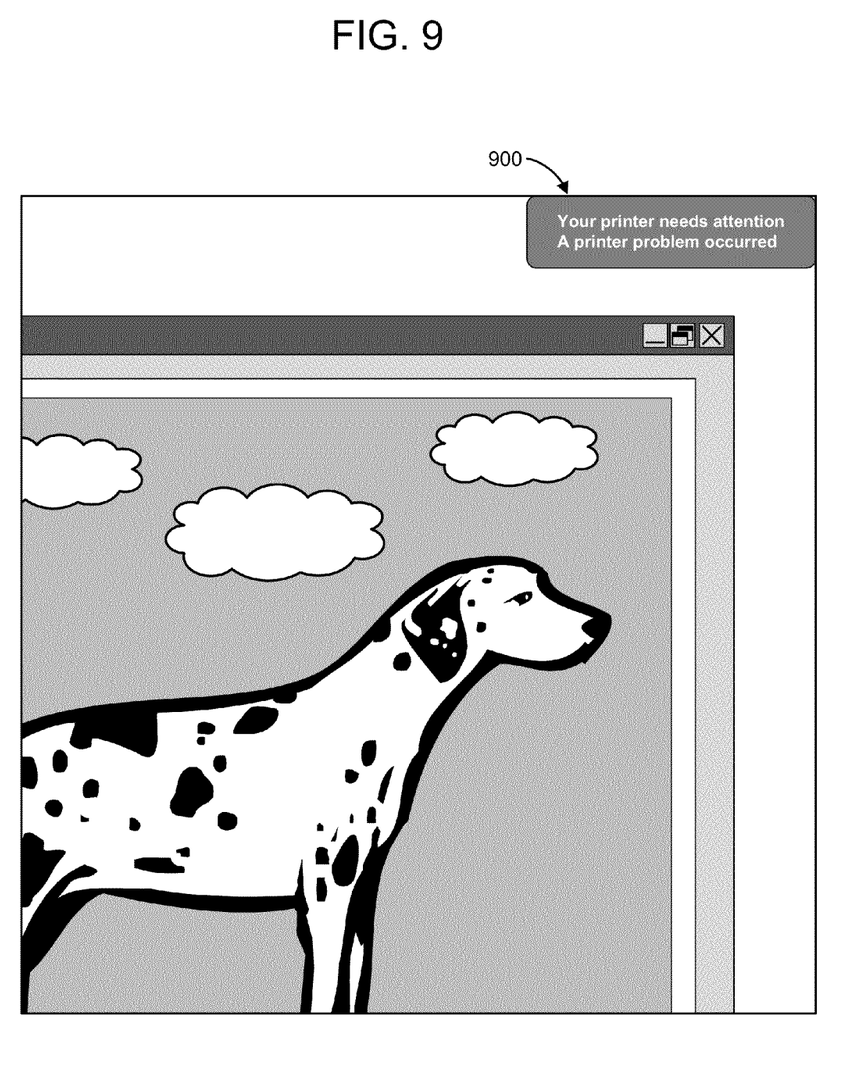
FIG. 9 illustrates an example embodiment of a system notification.

FIG. 9 illustrates an example embodiment of a system notification (e.g., the first notification). The system notification notifies the user of a problem when the printing device (e.g., the printing device 195) encounters a problem while processing a print job. For example, the illustrated system notification 900 notifies the user by displaying the following in the display box: "Your printer needs your attention. A printer problem occurred." The system notification (e.g., the system notification 900) is presented via I/O interfaces of the computing device (e.g., the computing device 100) as a pop-up message. Further, the system notification is configured to receive a user response, such as clicking, touching, or pressing.

Figure 10:
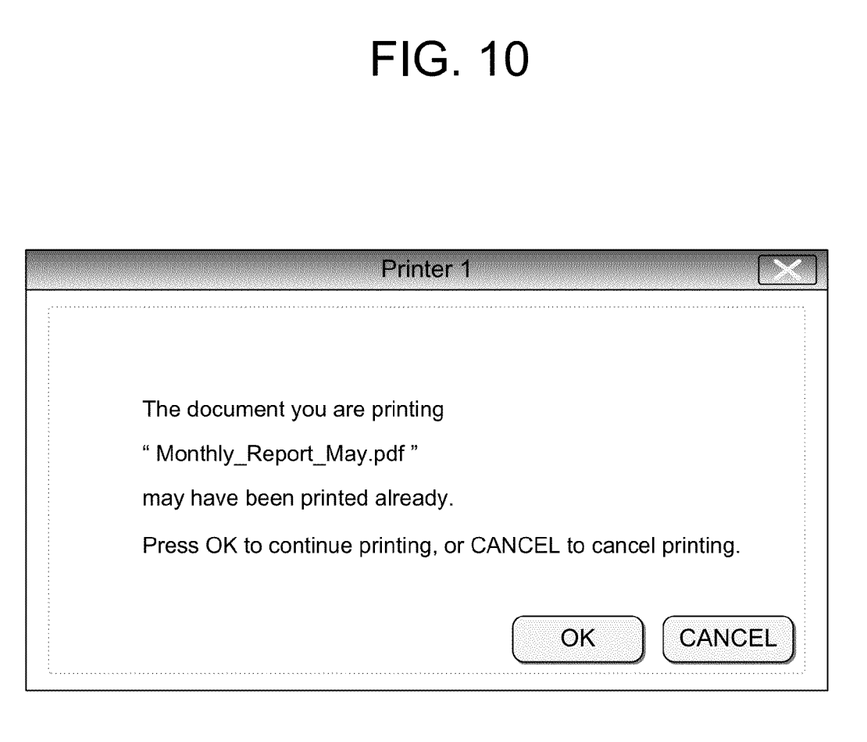
FIG. 10 illustrates an example embodiment of a reminder notification.

FIG. 10 illustrates an example embodiment of a reminder notification (e.g., the second notification). The reminder notification includes a description of the document to be printed, a warning statement to warn that the document may have been printed already, and an option to cancel or proceed with the printing of the document. When selecting the option to cancel the printing of the document, the user selects a cancel button. Otherwise, if a user decides to proceed with the printing of the document, an OK button is selected. In some embodiments, the description of the document indicates the title of the document or the submission time of the print request for the document. The reminder notification is displayed via the computing device (e.g., I/O interfaces of the computing device 100).

The above described devices, systems, and methods can be implemented by supplying one or more computer-readable media having stored thereon computer-executable instructions for realizing the above described operations to one or more computing devices that are configured to read the computer-executable instructions and execute them. In this case, the systems or devices perform the operations of the above-described embodiments when executing the computer-executable instructions. Also, an operating system on the one or more systems or devices may implement the operations of the above described embodiments. Thus, the computer-executable instructions or the one or more computer-readable media storing the computer-executable instructions thereon constitute an embodiment.

Any applicable computer-readable medium (e.g., a magnetic disk (including a floppy disk, a hard disk), an optical disc (including a CD, a DVD, a Blu-ray disc), a magneto-optical disk, a magnetic tape, and a solid state memory (including flash memory, DRAM, SRAM, a solid state drive)) can be employed as a computer-readable medium for the computer-executable instructions. The computer-executable instructions may be written to a computer-readable medium provided on a function-extension board inserted into the device or on a function-extension unit connected to the device, and a CPU provided on the function-extension board or unit may implement the operations of the above-described embodiments.

While the above disclosure describes illustrative embodiments, it is to be understood that the invention is not limited to the above disclosure. To the contrary, the invention covers various modifications and equivalent arrangements within the spirit and scope of the appended claims. Also, as used herein, the conjunction "or" generally refers to an inclusive "or," though "or" may refer to an exclusive "or" if expressly indicated or if the context indicates that the "or" must be an exclusive "or."

What is claimed is:

1. A method, executed by at least one processor, for controlling a print job, the method comprising:
receiving a request to print a print job;
recording, in the print job, a first time at which the request is received;
verifying that a printing device to which the print job is sent is ready to process the print job;

obtaining a second time at which the print job is received from a spooler;

calculating an elapsed time between the first time recorded in the print job and the second time obtained;

determining whether the elapsed time is larger than a predetermined time period; and generating, before printing the print job, a notification based on the verification that the printing device is ready to process the print job and the determination that the elapsed time is larger than the predetermined time period.

2. The method of claim 1, wherein the first time is recorded in a printticket of the print job.

3. The method of claim 2, wherein the first time is recorded in the printticket as a property.

4. The method of claim 1, further comprising:

displaying the notification on a display;

displaying, if the displayed notification was operated, a reminder notification including a first option to continue printing and a second option to cancel printing.

5. The method of claim 1, wherein the request to print the print job is received at a Windows v4 Print Driver.

6. The method of claim 1, wherein the notification notifies a user of a potential unnecessary print job to be printed.

7. The method of claim 1, further comprising receiving a user selection of whether to cancel the print job.

8. One or more non-transitory computer-readable media storing computer-executable instructions that, when executed by one or more computing devices, cause the one or more computing devices to perform operations comprising:

receiving a print request;

recording, in a print job of the print request, a first time at which the print request is received;

verifying that a printing device to which the print job is sent is ready to process the print job;

spooling the print job;

obtaining a second time at which the spooled print job is received;

calculating an elapsed time between the first time recorded in the print job and the second time obtained;

determining whether the elapsed time exceeds a predetermined threshold;

and generating, before printing the print job, a notification based on the verification that the printing device is ready to process the print job and the determination that the elapsed time exceeds the predetermined threshold.

9. The one or more computer-readable media of claim 8, wherein the first time is recorded at which the print request was received.

10. The one or more computer-readable media of claim 8, wherein the first time is recorded in a printticket of the print job.

11. The one or more computer-readable media of claim 10, wherein the first time is recorded in the printticket as a value of a property of the printticket.

12. The one or more computer-readable media of claim 8, wherein the notification includes a warning for printing potentially already processed print job.

13. The one or more computer-readable media of claim 8, further comprising:

displaying the notification on a display; and displaying, if the displayed notification was operated, a reminder notification including a first option to continue printing and a second option to cancel printing.

14. A system for controlling a print job, the system comprising:

at least one computer-readable medium; and at least one processor that is in communication with the at least one computer-readable medium and that is configured to cause the system to function as a receiving unit for receiving, from an application on one or more computing devices, a request to print a print job;

a recording unit for recording, in the print job, a first time at which the request is received from the application on one or more computing devices;

a verification unit for verifying that a printing device to which the print job is sent is ready to process the print job;

an obtaining unit for obtaining a second time at which the print job is received from a spooler;

a calculating unit for calculating an elapsed time between the first time recorded in the print job and the second time obtained;

a determining unit for determining whether the elapsed time is larger than a predetermined time period; and a generating unit for generating, before printing the print job, a notification based on the verification that the printing device is ready to process the print job and the determination that the elapsed time is larger than the predetermined time period.

15. The system of claim 14, wherein the first time is recorded in a printticket of the print job.

16. The system of claim 15, wherein the first time is recorded in the printticket as a property.

17. The system of claim 14, wherein the at least processor is further configured to cause the system to function as a display unit for displaying the notification and, if the displayed notification was operated, a reminder notification including a first option to continue printing and a second option to cancel printing.

18. The system of claim 14, wherein the request to print the print job is received at a Windows v4 Print Driver.

19. The system of claim 14, wherein the notification notifies a user of a potential unnecessary print job to be printed.

20. The system of claim 14, wherein the at least one processor is further configured to cause the system to function as a user selection receiving unit for receiving a user selection of whether to cancel the print job.

* * * * *